United States Patent [19]

Bidwell

[11] Patent Number: 4,687,392
[45] Date of Patent: Aug. 18, 1987

[54] TORQUE LIMITING FASTENER

[76] Inventor: Robert E. Bidwell, 27 Montrose Pl., Melville, N.Y. 11747

[21] Appl. No.: 882,699

[22] Filed: Jul. 7, 1986

Related U.S. Application Data

[63] Continuation of Ser. No. 600,556, Apr. 17, 1984, abandoned, which is a continuation-in-part of Ser. No. 539,612, Oct. 6, 1983, abandoned.

[51] Int. Cl.$^4$ ............................................. F16B 31/00
[52] U.S. Cl. ...................................... 411/6; 411/432; 81/475
[58] Field of Search ........................................ 411/6–8, 411/14, 114, 115, 125–128, 138, 141, 145, 146, 326–331, 432; 81/472–475

[56] References Cited

U.S. PATENT DOCUMENTS

| | | | |
|---|---|---|---|
| 1,298,504 | 3/1919 | Hollingshead | 81/475 |
| 1,930,783 | 10/1933 | Watson et al. | 411/138 |
| 2,293,787 | 8/1942 | Worden | 81/475 |
| 2,685,812 | 8/1954 | Dmitroff | 411/7 |
| 3,283,567 | 11/1966 | Fietz | 411/14 |
| 3,289,524 | 12/1966 | Rubin | 411/7 |
| 4,159,667 | 7/1979 | Nordstrom | 411/7 |
| 4,176,582 | 12/1979 | Witte | 411/7 |

FOREIGN PATENT DOCUMENTS 562678  6/1977  U.S.S.R. .................................. 411/7

Primary Examiner—Gary L. Smith
Assistant Examiner—Neill Wilson
Attorney, Agent, or Firm—Brumbaugh, Graves Donohue & Raymond

[57] ABSTRACT

A torque limiting fastener in which a torque limiting coupling between telescoping head and driven elements includes a resilient spring carried by one element and a complementary recess formed in the other element, the engagement of the spring with the complementary recess resisting both axial and rotational displacement of the head element relative to the driven element when the head element is rotated in the tightening direction, and further includes a surface forming one end of the recess engageable by the spring to establish a positive connection between the elements when the head element is turned in the loosening or unscrewing direction.

11 Claims, 7 Drawing Figures

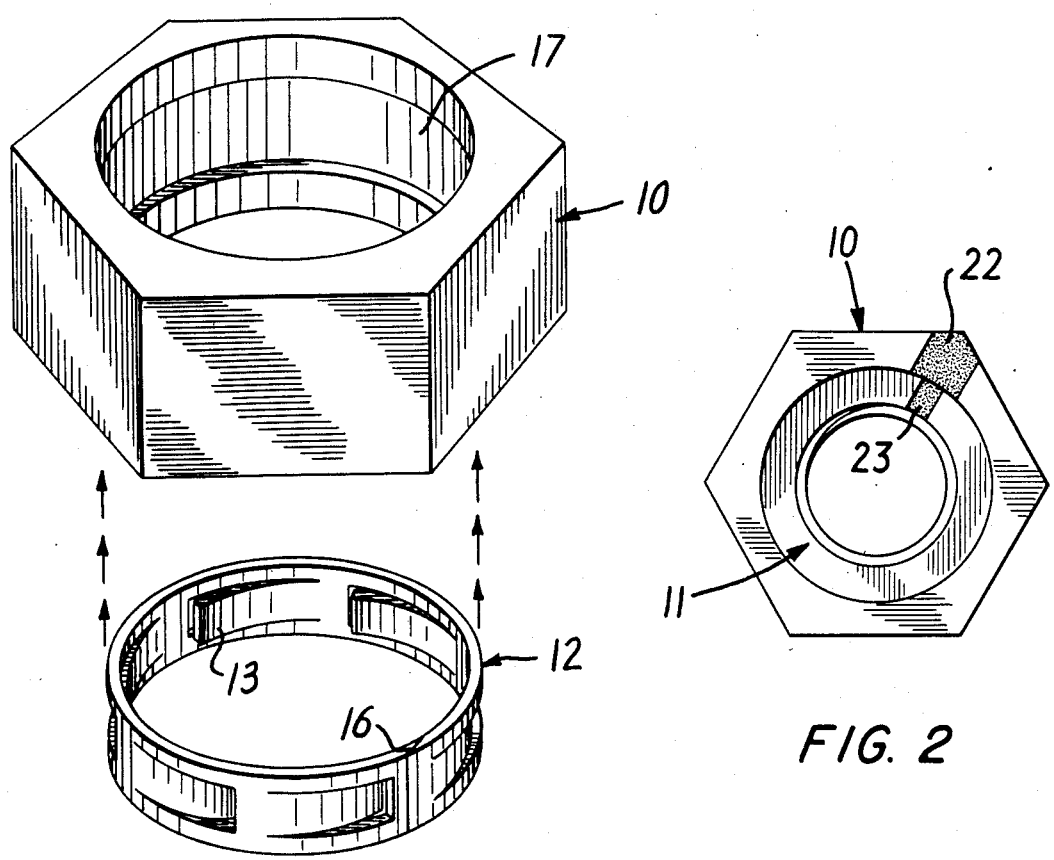
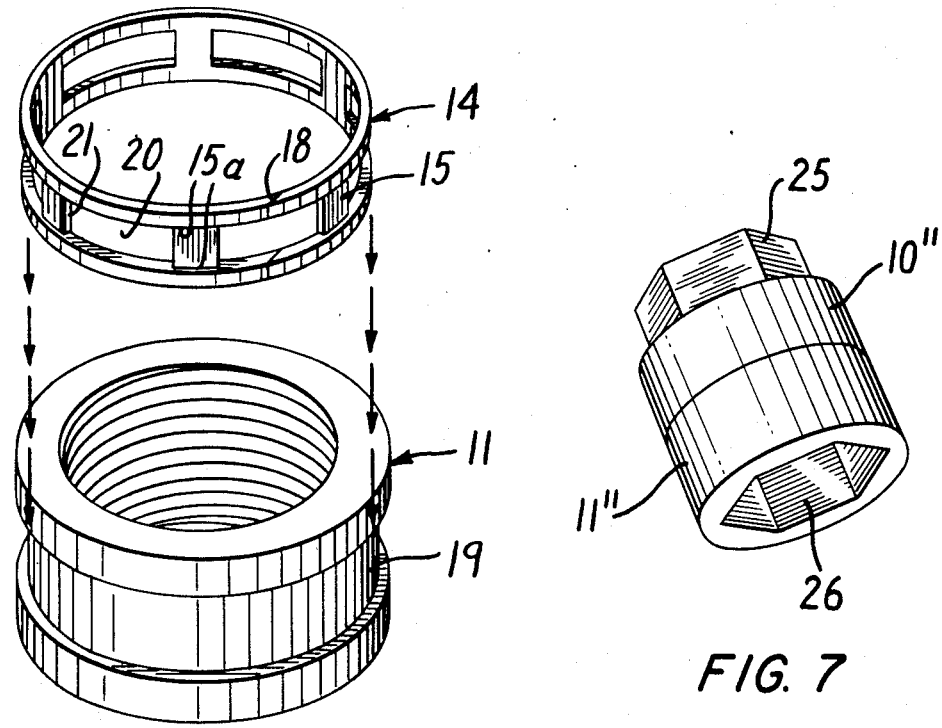
FIG. 2
FIG. 7
FIG. 1

TORQUE LIMITING FASTENER

This is a continuation of my co-pending application, Ser. No. 600,556, filed Apr. 17, 1984, now abandoned which, in turn, was continuation-in-part of my co-pending application, Ser. No. 539,612, filed Oct. 6, 1983, now abandoned.

This invention relates to a novel torque limiting fastener of the type in which a head element to which a torque is applied and a driven element to which the torque is applied through the head element are coupled to permit the elements to slip when the fastener has been tightened to a predetermined limit.

Torque limiting fasteners of this type are known and discussed in U.S. Pat. No. 2,685,812, issued Aug. 10, 1954, U.S. Pat. No. 3,280,689, issued Oct. 24, 1966, U.S. Pat. No. 3,425,314, issued Feb. 4, 1969, and U.S. Pat. No. 3,504,591, issued Apr. 7, 1970. In general the torque limiting fasteners heretofore proposed have been intricate and complex devices, difficult to make and assemble and without provision for enclosing the coupling to protect it from contamination that could cause malfunction. Moreover, in the '689 fastener separate heads are required for tightening and untightening so that care must be exercised in the selection of heads and in handling the torque applying tool.

The torque limiting fastener of the present invention embodies a novel torque limiting coupling that is effectively enclosed between the head and driven elements to protect the coupling from dirt and other contamination. The driven element can be threaded or coupled to a threaded element, and the head element, which is readily accessible to the torque applying tool, applies the torque for both tightening and loosening the threaded element.

More specifically, the torque limiting fastener of the present invention embodies telescoping head and driven elements and an interlocking coupling which includes a resilient spring carried by one of the elements and a complementary shaped recess carried by the other of the elements to receive the spring and interlock the elements together, both to prevent the axes of the elements from being displaced relative to each other and to insure that when the fastener is being tightened the rotation of the head element imparts rotation to the driven element to the torque limit for which it is designed. The coupling also includes a shoulder formed at one end of the recess and engageable by the end of the spring to establish a positive connection between the elements to permit the threaded element to be unscrewed.

In a preferred embodiment of the torque limiting fastener of the present invention the components of the torque limiting coupling are formed in a pair of interlocking rings which are easy-to-make parts that are separate from the head and driven elements which are ordinarily made of heavy solid steel. The spring is readily formed in one ring and the complementary recess and shoulder are readily formed in the other ring from a lighter weight resilient material by punching and slitting operations.

The torque limiting fastener of the present invention, as an optional feature to facilitate inspection, can be provided with aligned indicia on the head and driven elements that will move out of alignment when the torque limit has been exceeded. Unless the indicia are moved out of alignment, there is reason to suspect that the torque limiting fastener may not have been tightened to the limit for which it has been designed.

For a more complete understanding of the present invention, reference can be made to the detailed description which follows and to the accompanying drawings in which:

FIG. 1 is an exploded perspective of the components of the torque limiting fastener of the present invention;

FIG. 2 is a plan view of an alternative embodiment of the fastener shown in FIG. 1;

FIG. 7 is a perspective view of still another embodiment of the invention in which the driven element has a nut engaging socket formed therein.

Figure 3:
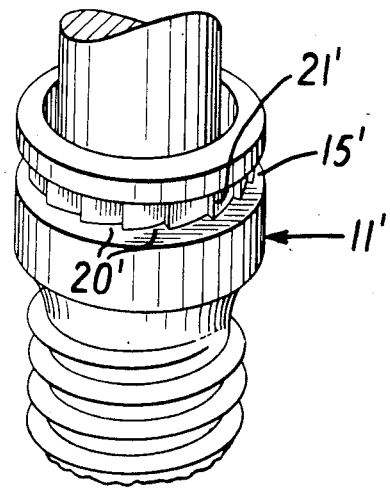
FIG. 3 is a perspective view of the driven element of another alternative embodiment of the present invention.

The torque limiting fastener of the present invention shown in FIG. 1 includes a head element 10, a driven threaded element 11, a coupling ring 12 insertable within the head element and having resilient springs 13 extending inwardly of said ring and a coupling ring 14 insertable on the threaded element and having a channel 15 formed in the outer periphery thereof between two axially spaced walls 15a for receiving the resilient springs 13 so as to interlock the head and threaded elements together.

The ring 12 is made of resilient material, such as spring steel, and it is split at 16 along a diagonal line to permit the ring to be compressed and assembled within an annular groove 17 within the head element 10. The ring 14 is also made of the same resilient material and is split at 18 along a diagonal line to permit it to be expanded and set within the annular groove 19 around the outer periphery of the threaded element 11.

The head and threaded elements 10 and 11 can be assembled in interlocking relationship by telescoping the head and threaded elements to force the resilient springs 13 of the ring 12 into the circumferential channel 15 of the ring 14. Interlocking of the head and threaded elements is facilitated by outward yielding of the springs against the outer periphery of the threaded element until they come into alignment with the channel 15, whereupon they snap into the channel to interlock the head and threaded elements. The rings are thus enclosed between the head and threaded elements, and an effective seal for the rings can be provided by maintaining close tolerances between the inner periphery of the head element and the outer periphery of the threaded element.

The springs 13 are formed integrally with and cut from the walls of the ring 12. The springs are then bent inwardly so that the ends extend inside the inner periphery of the ring. They will, however, deflect outwardly into their respective recesses in the ring to permit assembly of the head and threaded elements into interlocking relationship.

The channel 15 of the ring 14 has a plurality of recesses 20 therein in the form of apertures or windows of generally complementary shape to the springs 13. These apertures or windows are defined between the axially spaced walls 15a and the circumferentially spaced walls or shoulders 21. When the head and threaded elements are in interlocking relationship the ends of the springs 13 extend into and are accommodated within the complementary shaped apertures or windows in the channel.

The ring 12 is dimensioned so that the outer periphery is in tight fitting relationship with the surrounding surface of the groove 17, locking the ring 12 within the head element 10. Similarly, the ring 14 is dimensioned so that it is in tight fitting relationship around the outer surface of the groove 19, locking the ring 14 on the threaded element 11. If desired, the ring 12 can be permanently attached within the head element 10 and the ring 14 can be permanently attached around the threaded element 11.

When the fastener is to be threaded onto a threaded member, the head element is rotated, and the rotation will be transmitted to the threaded element through the interlocking rings 12, 14. When the torque limit has been reached, the springs 13 will deflect outwardly and slip relative to the recesses 20 without imparting any further rotation to the threaded element.

When the fastener is to be loosened and unscrewed, the rotation of the head element in the opposite direction will permit the springs to enter the respective recesses, bringing the free ends of the springs into direct engagement with the corresponding shoulders 21, thereby providing a positive connection between the head element and the threaded element which permits the threaded element to be unscrewed.

The torque limit applied by the fastener can be controlled in various ways, for example, by the width, gauge, length and friction of the springs, the number of springs and recesses, and by various other ways obvious to a person of ordinary skill in the art. The fastener should ordinarily be tightened to the full limit for which it has been designed. To facilitate inspection and insure that the fastener is tightened to its full limit, one or both ends of the assembled head and threaded elements 10 and 11 can be embossed with radially extending aligned indicia 22 and 23, respectively, as shown in FIG. 2. These indicia will remain in alignment until the torque limit has been reached. Further torque applied to the head element will turn the head element relative to the threaded element, moving the indicia on the head element out of alignment with respect to the indicia on the threaded element. If the indicia are in alignment the inspector is alerted to the possibility that the fastener has not been tightened to the limit for which it has been designed.

Figure 4:
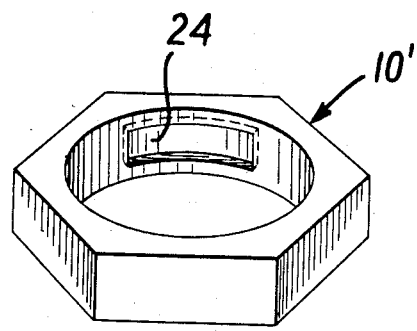
FIGS. 4 and 5 are perspective and plan views, respectively, of the head element for use with the driven element shown in FIG. 3.
Figure 5:
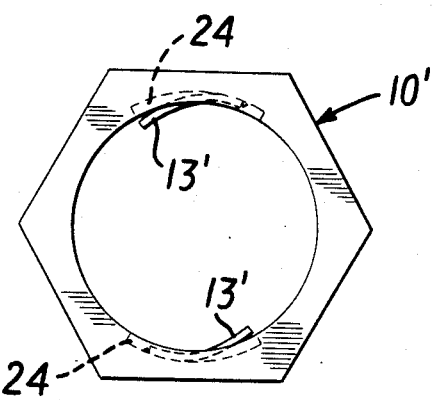
Figure 6:
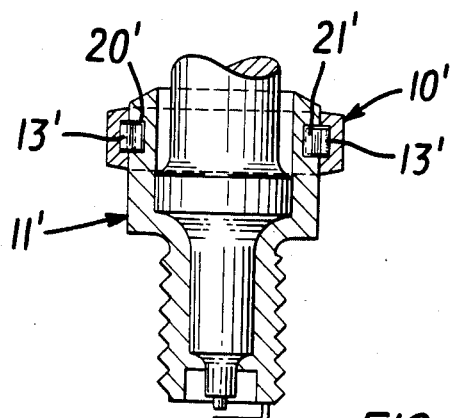
FIG. 6 is a cross-sectional elevational view of the head element shown in FIGS. 4 and 5 and the driven element shown in FIG. 3 assembled.

An alternative embodiment of the torque limiting fastener of the present invention is shown in FIGS. 3 through 6 in a spark plug application. The invention insures that the spark plug will be tightened to the limit for which it has been designed and that it will not be damaged by excessive tightening.

In the spark plug application the head element 10' carries a plurality of resilient springs 13' which are suitably mounted at one end within recesses 24 in the inner periphery of the head element and extend inwardly out of the recesses at the opposite end. The head element 10' is assembled on the threaded spark plug element 11' to interlock the springs 13' within a channel 15' containing a plurality of recesses 20' each having a shoulder 21'

A formed at one end of each recess. When the head element is assembled on the threaded spark plug element the close tolerance between the inner periphery of the head element and the outer periphery of the threaded element enclose and effectively seal the springs 13' and the channel 15' from grease, dirt and other contaminants.

When torque is applied to the head element to install the spark plug, it will screw into its socket until the torque limit of the fastener is reached, at which time further torque applied to the head element will cause the head element to slip relative to the threaded spark plug. In the removal of the spark plug, the spring elements 13' will engage the shoulders 21' to establish a positive connection to permit the spark plug to be unscrewed from its socket.

Another alternative embodiment of the torque limiting fastener is shown in FIG. 7. In this embodiment the head element 10" has a standard hexagonal nut 25 formed at one end thereof and the driven element 11" has a hexagonal socket 26 at the opposite end thereof to permit torque limiting fastener to tighten a standard nut. The head and driven elements, 10" and 11" respectively, are connected in telescoping relation by a torque limiting coupling of the type shown in one of the embodiments of FIGS. 1 or 6. This arrangement permits a standard hexagonal nut to be tightened to the torque limit for which the fastener has been designed and which may be specified on the torque limiting fastener.

The invention has been shown in preferred embodiments, and obviously many variations and modifications can be made within the spirit of the invention. The invention, therefore, is not intended to be limited to any specified form or embodiment except in so far as such limitations are expressly set forth in the claims.

I claim:

1. A torque limiting fastener comprising a driving element to which a torque is applied, a driven element in telescoping relation with the driving element, and a torque limiting coupling enclosed between the inner and outer peripheries of the elements, said coupling including a pair of concentric rings, one carried by each of the elements, a resilient metal leaf spring carried by one ring, the leaf spring having a deflectable free end, a recess of generally complementary shape to the spring carried by the other ring to receive the deflected free end of the spring and interlock the elements together, and a pair of axially spaced walls defining the axial width of the recess, the engagement of the free end of the spring with the recess resisting axial displacement of the elements relative to each other and the engagement of the free end of the spring with a surface adjacent the recess between said pair of axially spaced walls resisting rotational displacement in one direction to insure that when torque is applied to the driving element the rotation of the head element imparts rotation to the driven element to the torque limit for which it is designed and that the spring will yield and disengage from the recess when the torque limit is reached, the free end of the spring being initially deflectable from an inoperative position to permit the separate elements to be moved into telescoping relation to a position at which the free end of the spring moves automatically from the inoperative to its locking position within the recess and between the pair of axially spaced walls.

2. A torque limiting fastener comprising a driving element to which a torque is applied, a driven element in telescoping relation with the driven element and a torque limiting coupling enclosed between the inner and outer peripheries of the elements, said coupling including a pair of concentric rings made of resilient material, one carried by each of the elements, a resilient spring carried by and formed integrally with one ring, a recess formed in the other ring, said recess being of generally complementary shape to the spring, said spring having a free end offset from the respective ring in a direction to engage the recess in the other ring and interlock the elements together, and a pair of axially spaced walls defining the axial width of the recess, the engagement of the spring with the recess resisting both axial and rotational displacement of the elements relative to each other to insure that when torque is applied to the driving element the rotation of the driving element imparts rotation to the driven element to the torque limit for which it is designed and that the spring will yield and disengage from the recess when the torque limit is reached.

3. A torque limiting fastener comprising a generally cylindrical driving element to which a torque is applied, a correspondingly sized driven element assembled by being moved axially into telescoping relation with the driving element and a torque limiting coupling enclosed between the inner and outer peripheries of the elements, said coupling including a resilient metal leaf spring pivotally carried at one end by the driving element and having its opposite free end bent toward and in interlocking engagement with the driven element, said metal leaf spring being inherently rigid in the plane of the leaf spring and being inherently deflectable from its pivoted end in directions perpendicular to the plane of the leaf spring, an annular recess defined by a pair of axially spaced rigid walls carried by the driven element for receiving the free end of the leaf spring in the interlocking position, said free end of the spring being deflectable away from its position of interlocking engagement with the driven element to a recessed position toward the driving element to permit the driving and driven elements to be assembled in telescoping relation, the free end of the spring automatically pivoting from the recessed position to the interlocking position engaging said annular recess between the rigid walls when the elements are assembled in telescoping relation, the rigidity of the leaf spring in the plane thereof preventing axial displacement of the elements when the free end of the spring is in interlocking position engaging said annular recess, a surface within the annular recess engageable with a face of the free end of the leaf spring to impart torque from the driving element to the driven element to the torque limit for which the leaf spring is designed to impart torque, whereupon the leaf spring will deflect away from said surface, and another surface in the annular recess engageable by the end edge of the leaf spring when the direction of rotation of the driving element is reversed to impart rotation from the driving element to the driven element through the relatively rigid plane of the leaf spring.

4. A torque limiting fastener as set forth in claim 3 in which said pair of axially spaced rigid walls are integrally connected.

5. A torque limiting fastener as set forth in claim 2 in which the coupling rings are split and made of resilient material so that one ring can be expanded to engage one element tightly and the other ring can be compressed to engage the other element tightly.

6. A torque limiting fastener as set forth in claim 2 in which the recess is an aperture in the ring defined between the pair of axially spaced walls for receiving the spring of the other ring and to resist relative displacement of the axes of the elements and between a pair of circumferentially spaced walls, one engageable by the spring remote from the free end to tighten the driven element and the other engageable by the free end of the spring to loosen and unscrew the driven element.

7. A torque limiting fastener as set forth in claim 6 including a channel formed in the ring carrying the recess and in which the recess is an aperture in the ring and the ring has a plurality of apertures formed in the channel and in which the other ring has a plurality of resilient springs integrally formed with and cut from the ring.

8. A torque limiting fastener as set forth in claim 2 in which one element has an inner peripheral surface to accommodate the outer peripheral surface of the other element and including annular grooves in the inner and outer peripheral surfaces of the elements to receive the rings and in which the inner and outer peripheral surfaces of the elements adjacent said grooves enclose the rings and protect them from contaminants.

9. A torque limiting fastener as set forth in claim 3 including aligned indicia carried by the elements when the spring is in engagement with the recess, the indicia moving out of alignment when torque is applied to the head element when the limit for which the coupling is designed has been reached.

10. A torque limiting fastener as set forth in claim 3 in which the driven element is threaded.

11. A torque limiting fastener as set forth in claim 3 in which the driven element accommodates a nut engaging socket.

* * * * *